United States Patent [19]
Rieder et al.

[11] Patent Number: 6,050,571
[45] Date of Patent: Apr. 18, 2000

[54] SEALING ARRANGEMENT FOR A CARDAN SPIDER BUSHING

[75] Inventors: Guido Rieder, Wilhelmsdorf; Siegfried Götz, Hausen; Manfred Würch, Aurachtal; Martin Kruppa, Herzogenaurach, all of Germany

[73] Assignee: Ina Walzlager Schaeffler oHG, Germany

[21] Appl. No.: 09/006,986

[22] Filed: Jan. 14, 1998

[30] Foreign Application Priority Data

Jan. 17, 1997 [DE] Germany .......................... 197 01 461

[51] Int. Cl.[7] ..................................................... F16J 15/32
[52] U.S. Cl. ........................... 277/353; 277/565; 384/486; 464/131
[58] Field of Search ...................... 277/353, 551, 277/553, 562, 565, 574; 464/128, 131; 384/486, 487

[56] References Cited

U.S. PATENT DOCUMENTS

| | | | |
|---|---|---|---|
| 3,479,840 | 11/1969 | Meyers | 277/553 X |
| 4,576,382 | 3/1986 | Scharting et al. | 277/353 X |
| 4,806,026 | 2/1989 | Bauer et al. | 277/353 X |
| 5,026,324 | 6/1991 | Schurger et al. | 277/551 X |
| 5,725,431 | 3/1998 | Myers et al. | 464/128 |
| 5,769,723 | 6/1998 | Faulbecker et al. | 464/131 |

FOREIGN PATENT DOCUMENTS

| | | |
|---|---|---|
| 3824212 | 1/1990 | Germany . |
| 4110154 | 10/1992 | Germany . |
| 4128179 | 2/1993 | Germany . |
| 4408831 | 9/1995 | Germany . |
| 93/06378 | 4/1993 | WIPO ................ 386/486 |

*Primary Examiner*—Lynne H. Browne
*Assistant Examiner*—Greg Binda
*Attorney, Agent, or Firm*—Bierman, Muserlian and Lucas

[57] ABSTRACT

A sealing arrangement for a bearing bushing (1), particularly for a rolling bearing-mounted pin (6) of a cardan joint, said sealing arrangement comprising a rotary shaft seal (8) fixed against rotation on the bearing bush (1) by an armoring (3) and bearing sealingly against the pin (6) with a sealing lip (9), an armored fore-seal (5) disposed in front of the rotary shaft seal (8) and secured against rotation on the pin (6) while being supported on an end face (12) of the bearing bushing (1) wherein the rotary shaft seal (8) is made in one-piece with a rubber packing (15) of a sealing material extending towards the open end of the bearing bush (1) and forming a sealing lip (16) which is supported on an armoring (18) of the fore-seal (5).

14 Claims, 2 Drawing Sheets

SEALING ARRANGEMENT FOR A CARDAN SPIDER BUSHING

FIELD OF THE INVENTION

The invention concerns a sealing arrangement for a bearing bushing, and more particularly a bushing for a rolling bearing-mounted pin of a cardan joint, said sealing arrangement comprising an armored rotary shaft seal whose armoring comprising a cylindrical arm and a radial flange is fixed against rotation in an open end region of the pot-shaped bearing bushing, said rotary shaft seal bearing sealingly with at least one sealing lip against the pin, a separate armored fore-seal being arranged secure against rotation on the pin axially in front of the rotary shaft seal to bridge an annular gap between the pin and the bearing bushing while being supported on an end face of the bearing bushing.

BACKGROUND OF THE INVENTION

In a sealing arrangement of this type known from DE 44 08 831 A1, the armoring of the fore-seal is supported directly on the end face of the bearing bushing. The fore-seal fixed against rotation on the shaft journal comprises a sealing lip which is inclined inwards and bears sealingly against the armoring of the rotary shaft seal inside the bearing bushing. The direct contact between the armoring and the end face of the bearing bushing being a metal-to-metal contact, it has a rather inadequate sealing action. The sealing lip of the fore-seal which is inclined inwards, i.e. towards the interior of the bearing bush, does not offer adequate resistance to a medium penetrating into the bearing bushing through the seal gap and therefore likewise exhibits a restricted sealing action.

OBJECTS OF THE INVENTION

It is an object of the invention to improve the sealing action of a sealing arrangement of the pre-cited type for bearing bushings.

This and other objects and advantages of the invention will become obvious from the following detailed description.

SUMMARY OF THE INVENTION

The invention achieves the above objects by providing the rotary shaft seal with a further integrally formed sealing lip which is axially spaced from the first sealing lip of the rotary shaft seal and is supported on the armoring of the fore-seal. The sealing arrangement of the invention advantageously provides a long sealing lip arranged at a slant and bearing against the armoring. This improves the spring properties of the sealing lip and thus also the sealing action of the entire sealing arrangement. The sealing lip which bears against the armoring of the fore-seal is arranged so that its point of contact with the armoring is situated in the direction of a seal gap formed between the fore-seal and the end face of the bearing bush whereby an entry of fluid is obstructed.

In a preferred embodiment of the invention, a free end region of the cylindrical arm of the armoring is flush with an end face of the bearing bushing in an installed state. This end region is surrounded by a rubber packing which also extends over a defined axial length on the outer peripheral surface of the armoring, for which purpose the inner or bore wall of the bearing bushing is recessed radially outwards. With this rubber packing on the outer surface of the armoring, an effective sealing of the seal gap existing between the bore wall of the bearing bushing and the outer peripheral surface of the armoring is achieved.

The sealing arrangement of the invention also provides an integral rubber packing applied to the inside of the arm and the flange to connect the rotary shaft seal to the further sealing lip.

According to the invention, the L-shaped armoring, which is preferably positioned turned through 90° in the installed state, can be inserted into the bearing bushing with the radially inwards directed flange foremost. The flange serves a double purpose: firstly, it acts as a support for a disc spring inserted between the rolling elements and the armoring and, secondly, it limits the sealing arrangement comprising the fore-seal and the rotary shaft seal in the end region of the bearing bush.

According to another feature of the invention, the arm and the flange of the armoring can be made with almost identical dimensions and configurations. In a preferred installed state, the radially inwards directed flange is axially spaced both from the disc spring and the end face of the bearing bushing. The disc spring then bears against the end face of the free end of the cylindrical arm of the armoring. The flange is provided with a one-piece rubber packing constituting both the rotary shaft seal and the further sealing lip. To effectively seal a seal gap between the bore wall of the bearing bush and the outer peripheral surface of the armoring, a region of the rubber packing nearer the free end of the bearing bush on the radially inwards directed flange of the armoring is configured with an oversize relative to the inner diameter of the bearing bushing. In the installed state, this creates a preferred rubber packing which bears with enhanced surface pressure against the bore wall thus forming an interference fit.

The further sealing lip of the invention which is made integrally with the rotary shaft seal may bear against a cylindrical portion of the armoring of the fore-seal or, alternatively, against a radially extending region of the armoring.

To optimize the fore-seal, its armoring is preferably configured with a number of bends following the shape of the pin and/or the end region of the bearing bushing. In the installed state, the armoring is radially or axially spaced from the pin and the bearing bushing, the gaps therebetween being filled by a rubber packing.

To prevent a detrimental deformation of the rubber packing of the fore-seal when it is pushed axially on to the pin, the free end of the cylindrical portion of the armoring extending coaxially to the pin is provided with a radially inwards bent, preferably continuous peripheral flange or collar.

Defined axial contact surfaces and sealing zones of the fore-seal on the bearing bushing are provided by the invention as follows: an axial extension of the rubber packing of the fore-seal is supported on the bearing bushing and an axial projection or collar of the rubber packing surrounding the armoring of the rotary shaft seal bears against the rubber packing of the fore-seal.

In an advantageous embodiment of the invention, the sealing arrangement comprises a fore-seal having a U-shaped armoring profile turned through 90°, with all its sections extending radially or axially spaced from adjacent elements, the gaps being filled by rubber packings.

To keep the structure of the sealing arrangement of the invention as compact as possible i.e., in order not to increase the required design space, the radially outer, cylindrical arm of the armoring of the fore-seal is arranged in a radially inwards recessed end region of the bearing bushing. As an additional measure for improving sealing, the armoring is provided with a continuous rubber packing on its surface oriented towards the bearing bushing.

In another embodiment of the sealing arrangement of the invention, the armoring of the fore-seal is disc-shaped and extends in radial direction. Such an armoring offers a cost advantage and facilitates assembly.

A further advantageous embodiment of the invention comprises a protecting cap displaced axially in front of the fore-seal and having a cylindrical portion which interlocks with the bearing bush, particularly by a snap connection, a radially inwards oriented annular collar of the protecting cap extending up to the pin while leaving free an annular gap.

For obtaining interlocking by a snap connection between the cylindrical portion of the fore-seal, or the protecting cap, and the bearing bushing, the latter comprises a peripheral groove into which a radially inwards pointing bead of the rubber packing of the fore-seal or an extension of the cylindrical portion of the protecting cap, as the case may be, locks in the installed state. According to another feature of the invention, a further improvement of the sealing action of the fore-seal of the invention is obtained if the rubber packing of the fore-seal comprises at least one sealing lip which, in the installed state, bears sealingly against the radially inwards extending collar of the protecting cap. The available design space permits the arrangement of two radially spaced sealing lips on the fore-seal.

BRIEF DESCRIPTION OF THE DRAWINGS

Referring now to the drawings.

DETAILED DESCRIPTION OF THE DRAWINGS

Figure 1:
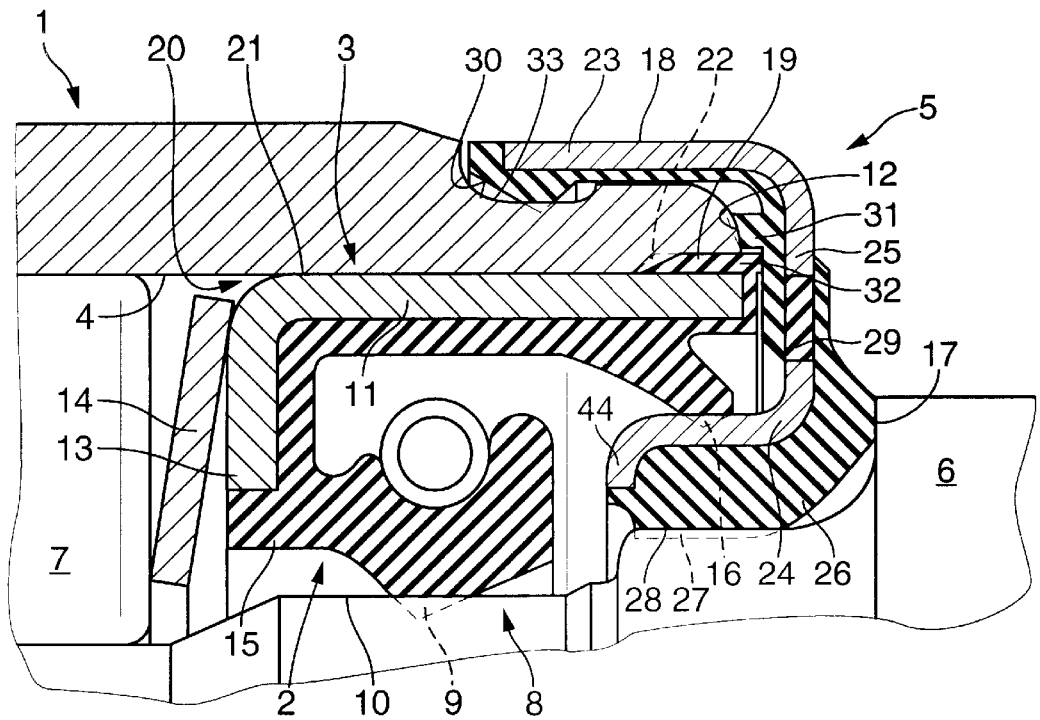
FIG. 1 is a semi-sectional view of a sealing arrangement of the invention comprising a rotary shaft seal with an axially offset, integrally formed sealing lip, and a fore-seal.

FIG. 1 shows a first embodiment of a sealing arrangement of the invention for a bearing bushing 1, shown in the installed state. The sealing arrangement comprises a seal 2 which is force-locked by an armoring 3 against an inner wall 4 of the bearing bushing 1. In front of the seal 2, there is arranged a fore-seal 5 which bridges an annular gap between a pin 6 and the bearing bushing 1, said pin 6 being mounted in the bearing bushing 1 with the help of rolling elements 7. The seal 2 comprises a rotary shaft seal 8 whose sealing lip 9 bears against a portion 10 of the pin 6 which is radially offset to the raceway of the rolling elements 7.

The armoring 3 of the seal 2 comprises an axially extending arm 11 whose free end is aligned to an end face 12 of the bearing bushing 1. At its end nearer the rolling elements 7, the armoring 3 comprises a radially inwards extending flange 13 on whose outer surface is supported a disc spring 14 arranged between the rolling elements 7 and the armoring 3. The armoring 3 is provided with a one-piece rubber packing 15 extending over the surfaces of the arm 11 and the flange 13 facing the pin 6 as well as around the free end of the arm 11. The rubber packing 15 is also integrally formed with the rotary shaft seal 8 and a further sealing lip 16 which extends at a slant radially inwards towards a shoulder 17 of the pin 6 to bear against an armoring 18 of the fore-seal 5. An effective sealing of an annular gap 20 between the inner wall 4 and a peripheral surface 21 of the arm 11 is assured by an end portion 19 of the rubber packing 15 having a defined axial dimension and extending on the outer surface of the free end of the arm 11. In the installed state of the seal 2, this end portion 19 is situated in a recess 22 of the bearing bushing 1.

The fore-seal 5 comprises a U-shaped armoring 18 turned through 90° and arranged to surround a free end of the bearing bushing 1. An outer axially extending arm 23 of the armoring 18 is axially spaced from the outer contour of the bearing bush 1 whose end is radially stepped. A further, inner axially extending arm 24, on which the sealing lip 16 is supported, is radially spaced both from the pin 6 and the arm 11 in the installed state. The arms 23 and 24 are connected by an annular, radially extending portion 25 which is arranged axially spaced from the end face 12. A one-piece rubber packing 26 is provided on the regions of the armoring 18 facing the pin 6 and the bearing bush 1. To prevent a rotation of the fore-seal 5 on the pin 6, the rubber packing 26 is fixed by an interference fit 27 on a portion 28 of the pin 6 and supported on the shoulder 17 of the pin 6.

To improve the connection of the rubber packing 26 to the armoring 18, for example by vulcanization, the radially extending portion 25 of the armoring 18 comprises peripherally spaced openings 29 which are filled by the rubber packing 26 to create a positive connection. The rubber packing 26 extends further from the openings 29 to the free end of the arm 23 and forms a radially inwards pointing bead 30 which bears sealingly against the bearing bush 1 in the region of an annular groove 33. To avoid exceeding the outer contour of the bearing bush 1, the arm 23 of the fore-seal 5 is arranged in a radially stepped end region of the bearing bush 1. To further improve the sealing action, the rubber packing 26 comprises, in the region of the end face 12, an axially extending peripheral extension 31 which bears sealingly against the bearing bush 1.

The sealing arrangement of the invention comprises a further seal gap which is arranged radially spaced from the extension 31 directly between the rubber packings 15 and 26. To form this seal gap, an axial extension 32 is provided on the end portion 19 of the rubber packing 15 and bears sealingly against a radial portion of the rubber packing 26. At the free end of the arm 24, the armoring 18 further comprises a radially inwards extending flange 44 which reduces a radial distance to the pin 6 and at the same time prevents an impermissible axial displacement of the rubber packing 26 during mounting of the fore-seal 5 on the pin 6.

Figure 2:
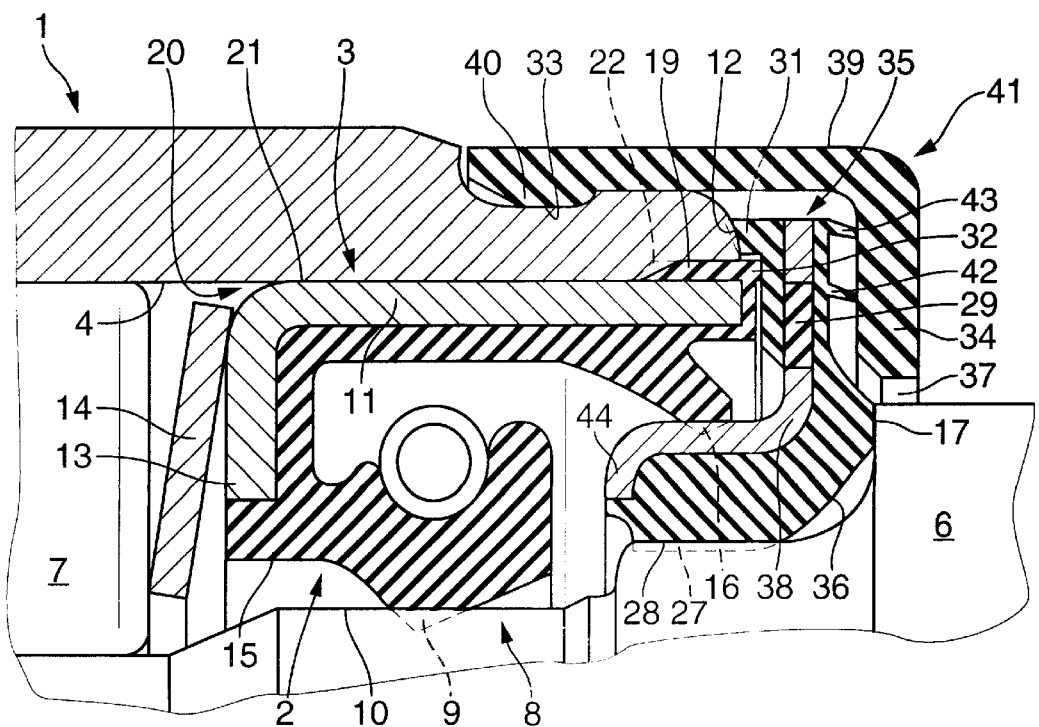
FIG. 2 is a semi-sectional view of another embodiment of the sealing arrangement of the invention having additionally a protecting cap, in contrast to FIG. 1.

In a second embodiment of the sealing arrangement of the invention shown in FIG. 2, the same reference numbers as in FIG. 1 have been used for parts identical to the embodiment of FIG. 1 so that reference may be made to the description of FIG. 1 for their description.

The sealing arrangement shown in FIG. 2 has a seal 2 corresponding to that of FIG. 1. The fore-seal 35 associated to this seal 2 has an armoring 38 which in contrast to the armoring 18 of FIG. 1 has no outer axially extending arm. In place of this, a protecting cap 41 is arranged in front of the fore-seal 35. The protecting cap 41 comprises a radially extending annular collar 34 which extends up to the pin 6 while leaving free an annular gap 37. An axially extending portion 39 of the protecting cap 41 comprises, in an end region, an inwardly oriented extension 40 which is locked into the annular groove 33 of the bearing bushing 1. The rubber packing 36 of the fore-seal 35 bears with two radially spaced sealing lips 42, 43 against the protecting cap 41.

Figure 3:
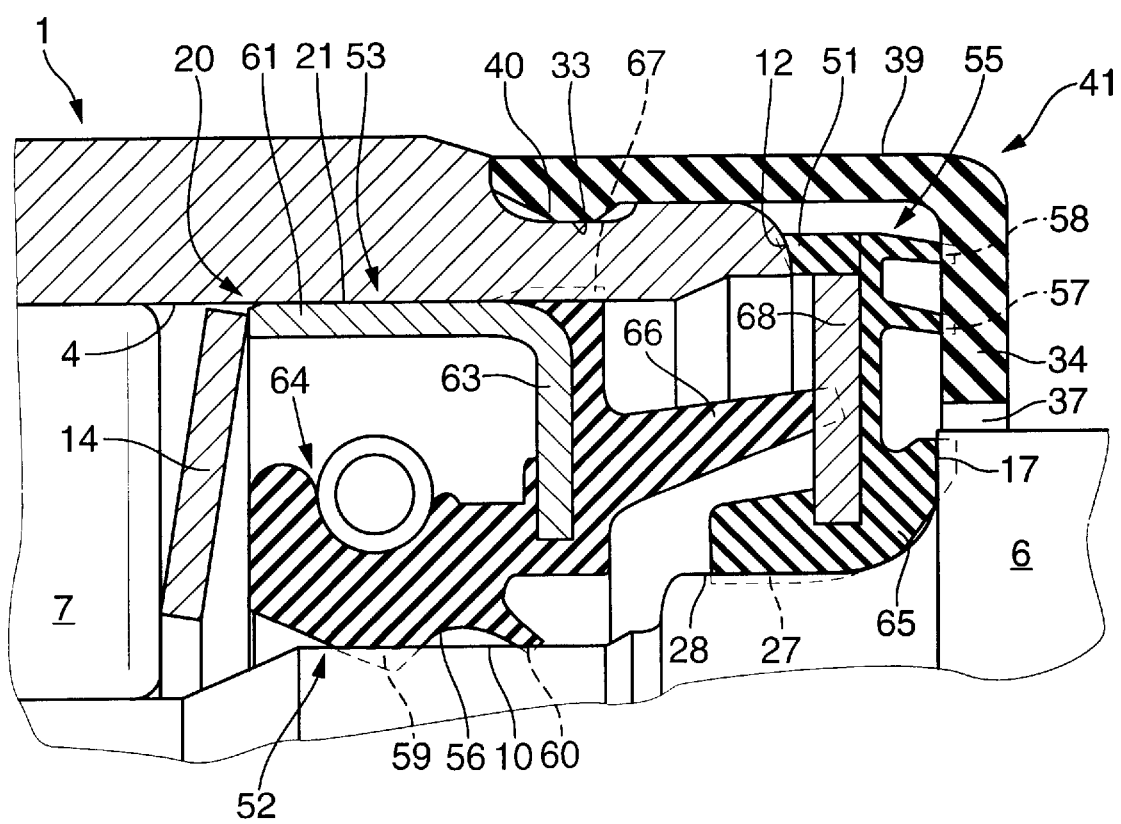
FIG. 3 is a semi-sectional view of a sealing arrangement of the invention similar to that of FIG. 2, with the fore-seal having a radially extending disc-shaped armoring.

In a further embodiment of the sealing arrangement of the invention shown in FIG. 3, the same reference numbers as in FIGS. 1 and 2 have been used for parts idential to the two previous embodiments so that reference may be made to the descriptions of FIGS. 1 and 2 for their description.

The sealing arrangement of FIG. 3 comprises the seal 52 whose armoring 53 is arranged in the bearing bushing 1 axially at a distance from the end face 12 of the bearing bush 1. The disc spring 14 is supported on the free end of the axially extending arm 61 of the armoring 53 which further comprises a radially inwards extending flange 63 arranged away from the rolling elements 7. A rubber packing 56 is provided on the side of the flange 63 facing the end face 12. This rubber packing 56 forms both a rotary shaft seal 64 and a sealing lip 66 which bears against an armoring 68 of the fore-seal 55.

To achieve a sealing of an annular gap 20 formed between the arm 61 and the inner wall 4 of the bearing bushing 1, the rubber packing 56 forms an interference fit 67 with the inner wall 4. In contrast to the seals 2 of FIGS. 1 and 2, the seal 52 comprises two axially spaced sealing lips 59 and 60. The fore-seal 55 comprises a disc-shaped armoring 68 which is provided with a rubber packing 65 in the direction of the pin 6 and the protecting cap 41. Similar to the embodiment of FIG. 2, the rubber packing 65 also comprises two radially spaced sealing lips 57 and 58 which bear sealingly against the protecting cap 41. In addition, an outer portion of the rubber packing 65 comprises an axially projecting extension 51 which is supported on the end face 12.

Various modifications of the sealing arrangement of the invention may be made without departing from the spirit or scope thereof and it is to be understood that the invention is intended to be limited only as defined in the appended claims.

What we claim is:

1. A sealing arrangement between a bearing bushing (1) and a rolling bearing mounted pin (6) of a cardan joint, said sealing arrangement comprising an armored rotary shaft seal (8) whose armoring (3) comprising a cylindrical arm (11) and a radial flange (13) is fixed against rotation in an open end region of the bearing bushing (1), said rotary shaft seal (8) bearing sealingly with at least one sealing lip (9) against the pin (6), a separate armored fore-seal (5) being arranged secure against rotation of the pin (6) axially in front of the rotary shaft seal (8) to bridge an annular gap between the pin (6) and the bearing bushing (1) while being supported on an end face (12) of the bearing bushing (1), characterized in that the rotary shaft seal (8) comprises a further integrally formed sealing lip (16) which is arranged in a region of the open end region of the bearing bush (1) and is supported on the armoring (18) of the fore-seal (5), the armoring (18) surrounds an end region of the bearing bushing (1) and is made in one piece with a rubber packing (26) to form the fore-seal (5) which is rotationally fixed on the pin (6) by the rubber packing.

2. A sealing arrangement of claim 1 wherein the cylindrical arm (11) of the armoring (3) is flush with the end face (12) of the bearing bushing (1) in an installed state, an axial end portion (19) of a rubber packing (15) is arranged on an outer peripheral surface of the cylindrical arm (11), and a recess (22) is formed on an inner wall (4) of the bearing bushing (1) by radial stepping.

3. A sealing arrangement of claim 2 wherein the one-piece rubber packing (15) connecting the rotary shaft seal (8) and the further sealing lip (16) is applied to inner surfaces of the cylindrical arm (11) and the radial flange (13).

4. A sealing arrangement of claim 2 wherein the axial end portion (19) of the rubber packing (15) seals an annular gap (20) between the inner wall (4) of the bearing bushing (1) and the armoring (3).

5. A sealing arrangement of claim 1 wherein in an installed state, a disc spring (14) is supported between the radial flange (13) and end faces of rolling elements (7).

6. A sealing arrangement of claim 1 wherein said further integrally formed sealing lip (16) bears radially spaced from the inner wall (4) against a cylindrical arm (24) of the armoring (18).

7. A sealing arrangement of claim 1 wherein a radially outer arm (23) of the armoring (18) of the fore-seal (5) is arranged in a radially inwards stepped end region of the bearing bushing (1).

8. A sealing arrangement of claim 1 wherein, viewed in cross-section, the armoring (18) of the fore-seal (5) has a U-shaped profile comprising a cylindrical arm (24) arranged at a radial distance to the pin (6), and a radial portion (25) parallel to the end face (12) of the bearing bush (1), a rubber packing (26) applied to the armoring (18) bridging the distance to the pin (6) and the end face (12).

9. A sealing arrangement of claim 8 wherein a radially inwards bent peripheral collar (44) is formed on a free end of the cylindrical arm (24) of the armoring (18).

10. A sealing arrangement of claim 8 wherein the rubber packing (26) oriented towards the end face (12) comprises an axially projecting extension (31) which bears against the end face (12) of the bearing bushing (1).

11. A sealing arrangement of claim 8 wherein an axial end portion (19) of the rubber packing (15) comprises an axially projecting extension (32) which bears sealingly against the rubber packing (26) of the fore-seal (5).

12. A sealing arrangement of claim 8 wherein the armoring of the fore-seal (5) has a U-shaped profile turned through 90°, all sections of said armoring extend radially and axially spaced from adjacent components and gaps are filled by the rubber packing (26).

13. A sealing arrangement of claim 8 wherein the rubber packing (26) associated to the cylindrical portion of the armoring of the fore-seal (5) is fixed against rotation of the pin (6) by an interference fit (27) in a radially recessed inner wall of the bearing bushing (1) and an axial stop is provided for said rubber packing (26) on a shoulder (17).

14. A sealing arrangement of claim 8 wherein, in the region of the free end of an arm (23), the rubber packing (26) comprises a radially inwards oriented bead (30) which engages an annular groove (33) of the bearing bushing (1) in an installed state.

* * * * *